(12) United States Patent
Bristow et al.

(10) Patent No.: US 11,193,854 B2
(45) Date of Patent: Dec. 7, 2021

(54) ESTIMATING FLUID PARAMETER

(71) Applicant: ROLLS-ROYCE plc, London (GB)

(72) Inventors: Maurice Bristow, Derby (GB);
Vasileios Kyritsis, Derby (GB)

(73) Assignee: ROLLS-ROYCE plc, London (GB)

( * ) Notice: Subject to any disclaimer, the term of this patent is extended or adjusted under 35 U.S.C. 154(b) by 304 days.

(21) Appl. No.: 16/422,334

(22) Filed: May 24, 2019

(65) Prior Publication Data

US 2019/0391047 A1 Dec. 26, 2019

(30) Foreign Application Priority Data

Jun. 20, 2018 (GR) .............................. 20180100267
Jun. 20, 2018 (GR) .............................. 20180100268

(51) Int. Cl.
*G01M 15/14* (2006.01)
*B64F 5/60* (2017.01)
(Continued)

(52) U.S. Cl.
CPC ............. *G01M 15/14* (2013.01); *B64C 19/02* (2013.01); *B64C 21/02* (2013.01); *B64D 31/06* (2013.01);
(Continued)

(58) Field of Classification Search
CPC ........ G01M 15/14; B64C 19/02; B64C 21/02; B64C 2230/06; B64D 31/06; B64D 31/14; F05D 2260/80
See application file for complete search history.

(56) References Cited

U.S. PATENT DOCUMENTS 4,162,630 A 7/1979 Johnson
4,248,042 A 2/1981 Larsen et al.
(Continued)

FOREIGN PATENT DOCUMENTS

EP 1178196 A2 2/2002
GB 2252131 A 7/1992
(Continued)

OTHER PUBLICATIONS

Nov. 4, 2019, European Search Report issued in European Patent Application No. 19179303.
(Continued)

*Primary Examiner* — Regis J Betsch
*Assistant Examiner* — Jeremy A Delozier
(74) *Attorney, Agent, or Firm* — Oliff PLC

(57) ABSTRACT

A method of estimating a parameter of a fluid flowing in a passage includes: having a plurality of instruments operable to measure one or more fluid properties flowing in the passage, the plurality of instruments being disposed in the passage and arranged within a common measurement plane; assigning a stream tube to each instrument, each stream tube represents a region of space in the common measurement plane within the passage and each stream tube surrounds one of the plurality of instruments, the stream tubes together correspond to the cross-sectional shape and area of the passage in the common measurement plane; measuring the one or more fluid properties using the instruments to obtain one or more measured values for each stream tube; using the measured value(s) for each stream tube to calculate a derived value for each stream tube; and summing the derived values across all of the stream tubes.

15 Claims, 6 Drawing Sheets

(51) Int. Cl.
*B64C 19/02* (2006.01)
*B64C 21/02* (2006.01)
*B64D 31/06* (2006.01)
*B64D 31/14* (2006.01)
*F02C 9/28* (2006.01)

(52) U.S. Cl.
CPC ............... *B64D 31/14* (2013.01); *B64F 5/60* (2017.01); *B64C 2230/06* (2013.01); *F02C 9/28* (2013.01); *F05D 2260/80* (2013.01)

(56) References Cited

U.S. PATENT DOCUMENTS

| | | | |
|---|---|---|---|
| 6,205,771 | B1 | 3/2001 | Rowe |
| 6,459,963 | B1* | 10/2002 | Bennett .................... F02C 9/28 701/14 |
| 6,595,062 | B1 | 7/2003 | Luke et al. |
| 7,159,401 | B1 | 1/2007 | Kurtz et al. |
| 2006/0117844 | A1 | 6/2006 | Birkle et al. |
| 2007/0276601 | A1* | 11/2007 | Parfitt .................... G01L 5/133 702/1 |
| 2009/0169367 | A1 | 7/2009 | Wadia et al. |
| 2012/0180548 | A1 | 7/2012 | Bosselmann |
| 2012/0186570 | A1* | 7/2012 | Bosselmann ............. G01P 5/10 123/703 |
| 2014/0208764 | A1 | 7/2014 | Ekanayake et al. |
| 2017/0002821 | A1* | 1/2017 | Claussen ............... F04D 29/701 |
| 2017/0138216 | A1 | 5/2017 | Giordan et al. |
| 2017/0191901 | A1* | 7/2017 | Lunel ....................... G01K 1/14 |
| 2017/0284304 | A1 | 10/2017 | Nestico et al. |

FOREIGN PATENT DOCUMENTS

| | | |
|---|---|---|
| RU | 2649715 C1 | 4/2018 |
| WO | 2006/125939 A1 | 11/2006 |

OTHER PUBLICATIONS

Nov. 8, 2019 European Search Report issued in European Patent Application No. 19179306.
Feb. 8, 2019 Combined Search and Examination Report issued in British Patent Application No. 1812874.4.
"Advanced Ducted Propulsor In-Flight Thrust Determination". SAE International, Aerospace Information Report, pp. 1-392, 2008.
U.S. Appl. No. 16/422,231, filed May 24, 2019 in the name of Kyritsis et al.
Aug. 4, 2021 Office Action issued in U.S. Appl. No. 16/422,231.

* cited by examiner

ESTIMATING FLUID PARAMETER

The present disclosure concerns apparatus and methods of estimating one or more parameters of a fluid flowing in a passage.

In a gas turbine engine for an aircraft, air entering an intake is accelerated by a fan to produce two air flows: a first air flow into a compressor and a second air flow which passes through a bypass duct to provide propulsive thrust. The second air flow may be larger than the first air flow.

The bypass duct comprises a generally annular passage. In the bypass duct of a gas turbine engine there are strong non-uniform profiles in pressure and temperature.

Accurately estimating the air flow through the bypass duct is important in carrying out performance verification and compliance of a gas turbine engine for an aircraft. Estimating the air flow through the bypass duct may be carried out as part of flight testing of a new aircraft engine. Estimating gross thrust, e.g. ideal gross thrust, may be carried out as part of flight testing of a new aircraft engine. Estimating flux of enthalpy within the bypass duct may also be of interest in analysing the operation of an aircraft engine.

Flight testing of a new aircraft engine informs the final revision of the engine power management. Power management correlates the amount of in-flight thrust analysed and delivered by the engine being tested and correlates in-flight thrust to a set of production measurements, which will later be used in production engines.

Uncertainty in analysed in-flight thrust can result in the engine being tested being either debited or credited for performance that it may not actually produce. Airframe and engine manufacturers desire that in-flight thrust uncertainty be minimised as much as possible.

For known engines, the performance of a sea level static nozzle rig has generally been assumed to be representative enough of in-flight conditions, such that only small corrections need be applied.

This assumption may not hold for new engines such as low specific thrust engines, due for instance to the unhocked cold nozzle and the closer installation of the engine to the wing.

Increased uncertainty in derived mass flow and velocity results in increased uncertainty in thrust that the engine manufacturer is committed to deliver and/or may affect specific fuel consumption guarantees.

According to a first aspect there is provided a method of estimating a parameter of a fluid flowing in a passage comprising:

providing a plurality of instruments operable to measure one or more properties of the fluid flowing in the passage, the plurality of instruments being disposed in the passage and arranged within a common measurement plane;

assigning a stream tube to each instrument, wherein each stream tube represents a region of space in the common measurement plane within the passage and each stream tube surrounds one of the plurality of instruments, wherein the stream tubes together correspond to the cross-sectional shape and area of the passage in the common measurement plane;

measuring the one or more properties of the fluid using the instruments to obtain one or more measured values for each stream tube;

using the measured value(s) for each stream tube to calculate a derived value for each stream tube; and summing the derived values across all of the stream tubes.

The fluid may comprise air.

The passage may comprise an annulus. The passage may be a bypass duct of a gas turbine engine. The annulus may be within a bypass duct of a gas turbine engine. The passage may be a duct of an electrically driven ducted fan.

The common measurement plane may be at an angle to a longitudinal axis of the passage. For instance, the common measurement plane may be at an angle of up to or at least 20°, up to or at least 30°, up to or at least 45°, up to or at least 60°, up to or at least 75° and/or up to 90° to the longitudinal axis of the passage. The common measurement plane may be perpendicular to the longitudinal axis of the passage.

The plurality of instruments may be located within the bypass duct downstream of a propulsive fan. The plurality of instruments may be located within the bypass duct upstream of a cold nozzle. The plurality of instruments may be located in the region of one or more outlet guide vanes within the bypass duct. Each outlet guide vane may comprise a leading edge and a trailing edge. The plurality of instruments may be disposed in the vicinity of, or upstream of, the leading edge of at least one outlet guide vane. The plurality of instruments may be disposed in the vicinity of, or downstream of, the trailing edge of at least one outlet guide vane. The plurality of instruments may be disposed between the leading edge(s) and the trailing edge(s) of the outlet guide vane(s).

The common measurement plane may be located within the bypass duct downstream of a propulsive fan. The common measurement plane may be located within the bypass duct upstream of a cold nozzle. The common measurement plane may be located in the region of one or more outlet guide vanes within the bypass duct. Each outlet guide vane may comprise a leading edge and a trailing edge. The common measurement plane may be disposed in the vicinity of, or upstream of, the leading edge of at least one outlet guide vane. The common measurement plane may be disposed in the vicinity of, or downstream of, the trailing edge of at least one outlet guide vane. The common measurement plane may be disposed between the leading edge(s) and the trailing edge(s) of the outlet guide vane(s).

The plurality of instruments may be arranged within the common measurement plane in a regular or an irregular pattern.

The regular pattern may comprise one or more lines of symmetry. The regular pattern may have two-or-higher-fold rotational symmetry. The regular pattern may have two-fold, three-fold, four-fold, five-fold, six-fold, seven-fold, eight-fold, nine-fold, 10-fold, 11-fold or 12-fold rotational symmetry.

The plurality of instruments may be arranged in one or more rings, each ring comprising a plurality of spaced-apart, e.g. regularly or irregularly spaced-apart, instruments. The plurality of instruments may be arranged in a plurality of rings. The plurality of rings may be concentric. In each of the rings, e.g. concentric rings, the circumferential spacing between the instruments may be the same or may vary.

The plurality of instruments may be spaced at intervals, e.g. regularly or irregularly spaced, in a circumferential direction and/or in a radial direction.

The property of the fluid measured by the plurality of instruments may include one or more of: pressure, e.g. static pressure or total pressure, temperature, fluid flow velocity, fluid flow speed and/or fluid flow direction, e.g. yaw, pitch or swirl angle of flow.

Each instrument may comprise a pressure sensor. Each instrument may include a sensor operable to measure or derive fluid flow velocity such as a Pitot tube, or a yaw probe.

Each instrument may comprise a sensor operable to measure or derive the direction of airflow, in addition to total and static pressure. Each instrument may comprise a yaw probe.

Summing the derived values across all of the stream tubes may include integrating the derived values across all of the stream tubes.

The derived value for each stream tube may comprise a derived fluid (mass or volume) flow value. The derived value for each stream tube may comprise a derived thrust value. The derived value for each stream tube may comprise a derived enthalpy value.

The derived value for each stream tube may constitute an estimate.

The parameter of the fluid flowing in the passage may comprise fluid (mass or volume) flow. The parameter of the fluid flowing in the passage may comprise thrust, e.g. gross thrust or ideal gross thrust. In embodiments where the instruments are operable to measure temperature, the parameter of the fluid flowing in the passage may comprise enthalpy.

By using the measured value(s) for each stream tube to calculate a derived value for each stream tube before summing the derived values across all of the stream tubes, a more accurate estimate of the parameter of the fluid flowing in the passage may be obtained.

The stream tubes may all have the same shape or may have one or more different shapes in cross-section within the common measurement plane. Each stream tube may have an annular sector shape in cross-section within the common measurement plane.

The method may be carried out in flight or at a ground test facility.

A second aspect provides an apparatus for estimating a parameter of a fluid flowing in a passage comprising:
- a plurality of instruments operable to measure one or more properties of the fluid flowing in the passage, the plurality of instruments being disposed in the passage and arranged within a common measurement plane.

The passage may comprise an annulus. The passage may be a bypass duct of a gas turbine engine. The annulus may be within a bypass duct of a gas turbine engine.

The common measurement plane may be at an angle to a longitudinal axis of the passage. For instance, the common measurement plane may be at an angle of up to or at least 20°, up to or at least 30°, up to or at least 45°, up to or at least 60°, up to or at least 75° and/or up to 90° to the longitudinal axis of the passage. The common measurement plane may be perpendicular to the longitudinal axis of the passage.

The plurality of instruments may be located within the bypass duct downstream of a propulsive fan. The plurality of instruments may be located within the bypass duct upstream of a cold nozzle. The plurality of instruments may be located in the region of one or more outlet guide vanes within the bypass duct. Each outlet guide vane may comprise a leading edge and a trailing edge. The plurality of instruments may be disposed in the vicinity of, or upstream of, the leading edge of at least one outlet guide vane. The plurality of instruments may be disposed in the vicinity of, or downstream of, the trailing edge of at least one outlet guide vane. The plurality of instruments may be disposed between the leading edge(s) and the trailing edge(s) of the outlet guide vane(s).

The common measurement plane may be located within the bypass duct downstream of a propulsive fan. The common measurement plane may be located within the bypass duct upstream of a cold nozzle. The common measurement plane may be located in the region of one or more outlet guide vanes within the bypass duct. Each outlet guide vane may comprise a leading edge and a trailing edge. The common measurement plane may be disposed in the vicinity of, or upstream of, the leading edge of at least one outlet guide vane. The common measurement plane may be disposed in the vicinity of, or downstream of, the trailing edge of at least one outlet guide vane. The common measurement plane may be disposed between the leading edge(s) and the trailing edge(s) of the outlet guide vane(s).

The plurality of instruments may be arranged within the common measurement plane in a regular or an irregular pattern.

The regular pattern may comprise one or more lines of symmetry. The regular pattern may have two-or-higher-fold rotational symmetry. The regular pattern may have two-fold, three-fold, four-fold, five-fold, six-fold, seven-fold, eight-fold, nine-fold, 10-fold, 11-fold or 12-fold rotational symmetry.

The plurality of instruments may be arranged in one or more rings, each ring comprising a plurality of spaced-apart, e.g. regularly or irregularly spaced-apart, instruments. The plurality of instruments may be arranged in a plurality of rings. The plurality of rings may be concentric. In each of the rings, e.g. concentric rings, the circumferential spacing between the instruments may be the same.

The plurality of instruments may be spaced at intervals, e.g. regularly or irregularly spaced, in a circumferential direction and/or in a radial direction.

The property of the fluid measured by the plurality of instruments may include one or more of: pressure, e.g. static pressure or total pressure, temperature, fluid flow velocity, fluid flow speed and/or fluid flow direction, e.g. yaw angle of flow.

Each instrument may comprise a pressure sensor. Each instrument may include a sensor operable to measure or derive fluid flow velocity such as a Pitot tube, or a yaw probe.

Each instrument may comprise a sensor operable to measure or derive the direction of airflow, in addition to total and static pressure. Each instrument may comprise a yaw probe.

The apparatus may comprise one or more data storage devices, e.g. a data logger, adapted to store the measured values measured by the instruments and/or the derived values calculated using the measured values. The data storage device(s) may be adapted to store the measured values and/or the derived values permanently or temporarily.

The plurality of instruments or the one or more data storage devices may be coupled to a data transmission device for transmitting the measured values to a computer or other data processing device.

A third aspect provides a system for estimating a parameter of a fluid flowing in a passage comprising:
- an apparatus according to the second aspect; and
- a computer adapted to communicate with the plurality of instruments and to:
  - receive measured values of the one or more properties of the fluid measured by the plurality of instruments;
  - assign a stream tube to each instrument, wherein each stream tube represents a region of space in the common measurement plane within the passage and each stream tube surrounds one of the plurality of instruments, wherein the stream tubes together correspond to the cross-sectional shape and area of the passage in the common measurement plane;
  - use the measured value(s) for each stream tube to calculate a derived value for each stream tube; and sum the derived values across all of the stream tubes.

Measured values measured by the plurality of instruments may be communicated to the computer in real-time or near-real-time.

The computer may be located remotely from the plurality of instruments.

The measured values may be communicated continuously, intermittently or periodically, e.g. at regular intervals.

The computer may be further adapted to generate an estimate of the parameter of the fluid flowing in the passage.

The derived value for each stream tube may comprise a derived fluid (mass or volume) flow value. The derived value for each stream tube may comprise a derived thrust value. The derived value for each stream tube may comprise a derived enthalpy value.

The derived value for each stream tube may constitute an estimate.

The parameter of the fluid flowing in the passage may comprise fluid (mass or volume) flow. The parameter of the fluid flowing in the passage may comprise thrust, e.g. gross thrust or ideal gross thrust. In embodiments where the instruments are operable to measure temperature, the parameter of the fluid flowing in the passage may comprise enthalpy.

Where the annulus is in a bypass duct of a gas turbine engine for an aircraft, the computer may be adapted to provide an estimate of in-flight thrust.

A fourth aspect provides a gas turbine engine comprising an apparatus according to the second aspect and/or a system according to the third aspect.

A fifth aspect comprises a vehicle comprising a gas turbine engine according to the fourth aspect and/or a system according to the third aspect.

The vehicle may be an aircraft. The vehicle may be a flight-test vehicle.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

In the Figures, like reference numerals are used for like components.

Figure 1:
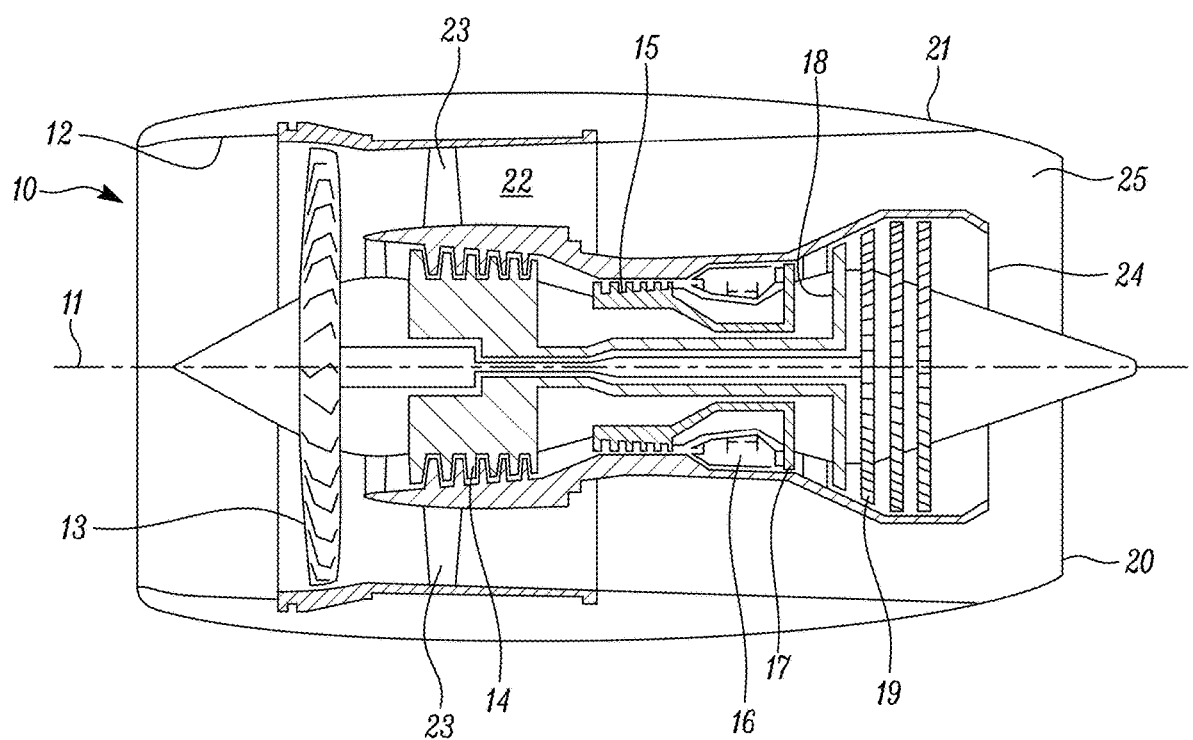
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20.

A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive, the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by a suitable interconnecting shaft.

In the bypass duct 22, downstream of the fan 13, there is a plurality of outlet guide vanes 23. The outlet guide vanes 23 are spaced at intervals circumferentially. The bypass duct 22 terminates at its downstream end at a cold nozzle 25. The cold nozzle 25 forms an annulus around a hot nozzle 24. Hot combustion products pass through the hot nozzle 24 after having driven the low pressure turbine 19. The cold nozzle 25 and the hot nozzle 24 communicate with the exhaust nozzle 20.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
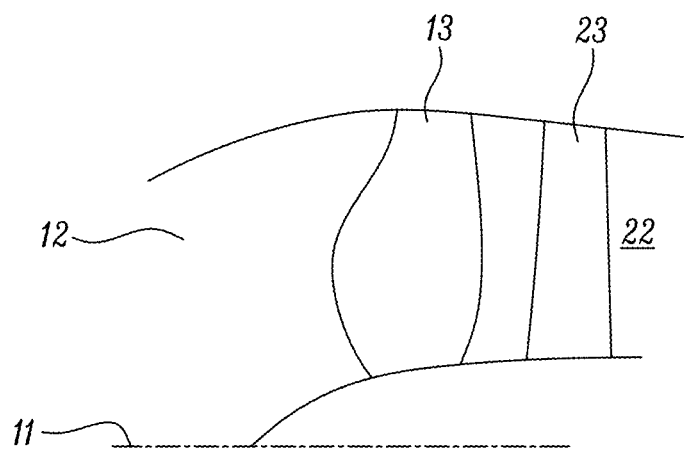
FIG. 2 is a schematic cross-sectional view of a front portion of a gas turbine engine.

FIG. 2 shows schematically a front portion of the gas turbine engine 10, magnified relative to FIG. 1. Only one side of the principal axis 11 is shown for clarity, although it will be understood that the other side of the principal axis 11 may be generally the same as the side shown. The air intake 12 is upstream of the propulsive fan 13. In the bypass duct 22 downstream of the propulsive fan 13 there is a plurality of outlet guide vanes 23.

Figure 3:
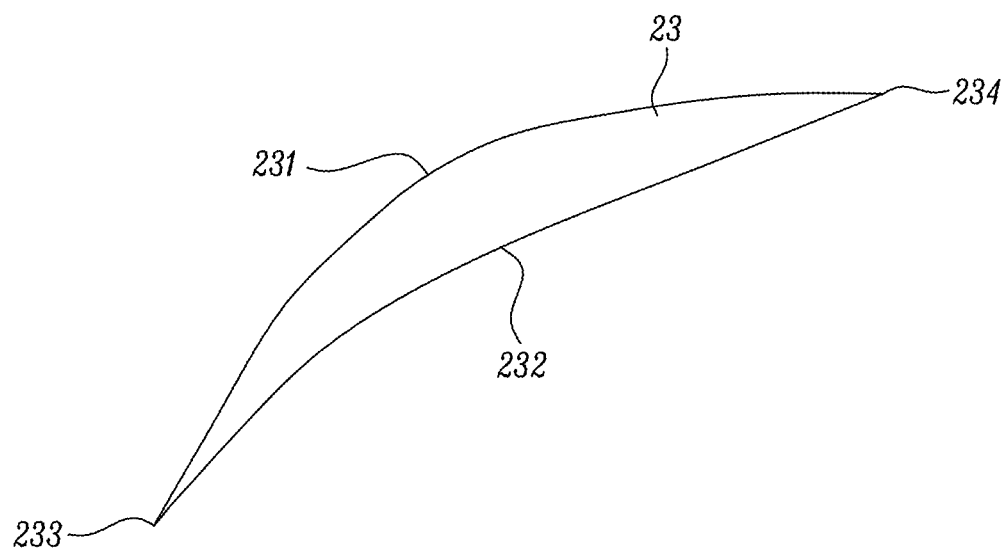
FIG. 3 is a cross-section of an outlet guide vane.

FIG. 3 shows one of the outlet guide vanes 23 in schematic cross-section. The outlet guide vane 23 has an aerofoil shape. The outlet guide vane 23 has two axial sides 231, 232 extending between a leading edge 233 and a trailing edge 234.

Figure 5:
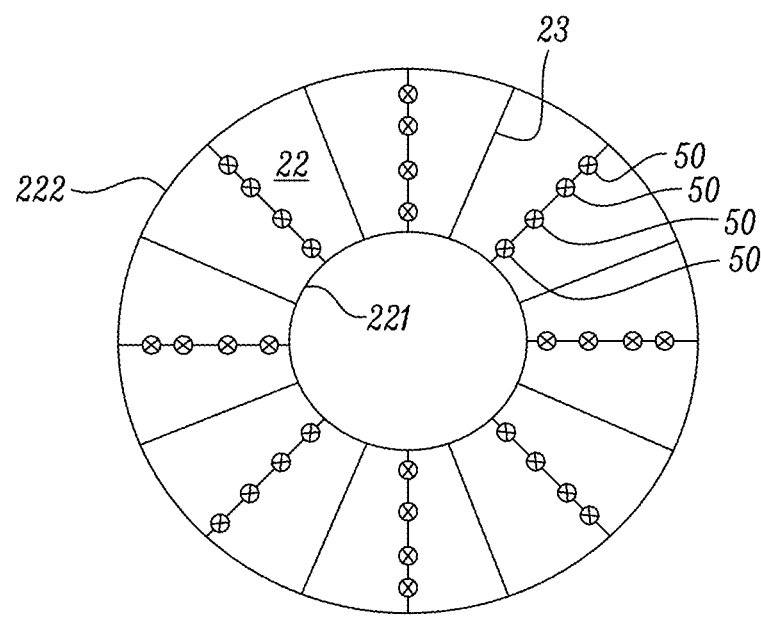
FIG. 5 shows a bypass duct in lateral cross-section at a position in the vicinity of the leading edges of the outlet guide vanes.

FIG. 5 shows the bypass duct 22 in lateral cross-section at a position in the vicinity of the leading edges of the outlet guide vanes 23. The bypass duct 22 has the form of an annulus and is defined by an inner wall 221 and an outer wall 222. At a regular circumferential spacing, a plurality of outlet guide vanes 23 each extend radially from the inner wall 221 to the outer wall 222.

As illustrated, there are 16 outlet guide vanes 23, which are regularly spaced circumferentially around the bypass duct 22. In embodiments, the plurality of outlet guide vanes may comprise a different number of outlet guide vanes. The circumferential spacing between the outlet guide vanes may not be regular.

An apparatus for estimating a parameter, e.g. (mass or volume) flow, of a fluid flowing in a passage is disposed in the bypass duct 22. The apparatus comprises a plurality of sensors 50. Four sensors 50 are disposed at the leading edge of every second outlet guide vane 23. The sensors 50 are spaced at intervals, which may be regular or irregular intervals, along the leading edge of every second outlet guide vane 23. Thus, in the illustrated example, four sensors 50 are disposed on eight of the 16 outlet guide vanes 23. Consequently, there is a regular pattern of 32 sensors 50 in a common measurement plane in the vicinity of the leading edges of the outlet guide vanes 23. The common measurement plane may coincide with the leading edges of the outlet guide vanes 23. The number and arrangement of the sensors 50 may vary. For instance, there may be more than or fewer than four sensors 50 disposed at the leading edge of every second outlet guide vane 23. The sensors 50 may be disposed at the leading edges of more than or less than half of the total number of outlet guide vanes 23.

The common measurement plane may be at any axial location within the bypass duct 22.

Each sensor 50 is operable to measure or derive the direction of airflow. Each sensor 50 may comprise a yaw probe.

Figure 6:
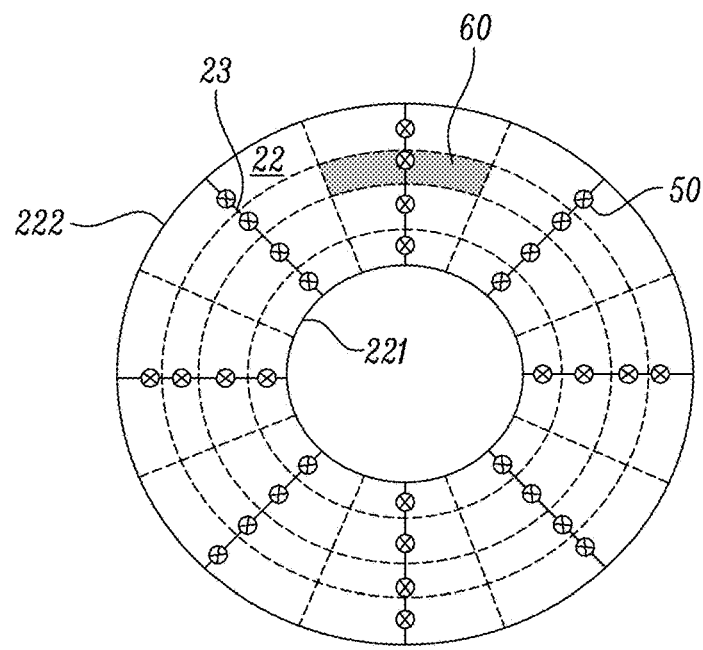
FIG. 6 illustrates stream tubes applied to the same cross-section as FIG. 5.

FIG. 6 shows the same cross-section of the bypass duct 22 as in FIG. 5. Like features are labelled with like reference numerals. For clarity, only the outlet guide vanes 23 with sensors 50 disposed at their leading edges are shown. The common measurement plane is divided into 32 stream tubes 60, as indicated by the dashed lines. Each stream tube 60 represents a region of space in the common measurement plane. Each stream tube 60 has the shape of an annular sector. Each stream tube 60 includes one sensor 50 at a central location therein. The number, arrangement and shape of stream tubes 60 may vary depending on the number and arrangement of sensors in the common measurement plane.

Figure 7:
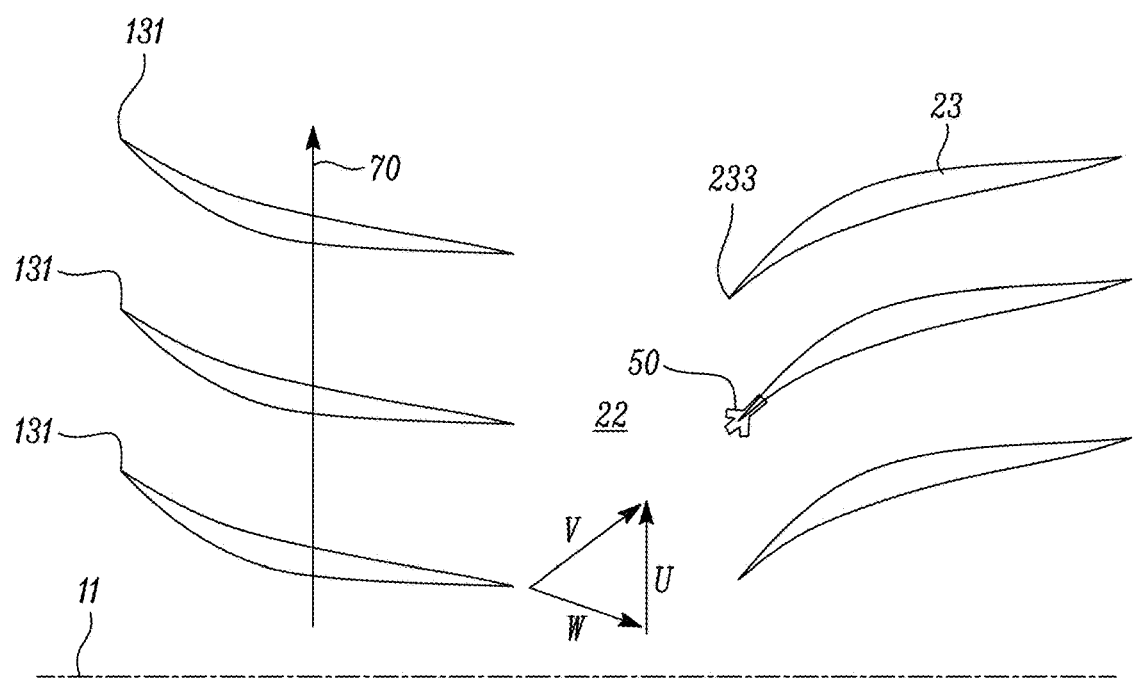
FIG. 7 is a schematic longitudinal cross-sectional view of a portion a bypass duct with an apparatus for estimating flow of a fluid through an annulus disposed therein.

FIG. 7 is a schematic longitudinal cross-sectional view of a portion of the bypass duct 22, including the apparatus shown in FIGS. 5 and 6. The principal axis 11 of the gas turbine engine is indicated by a dashed line. The propulsive fan 13 comprises a plurality of fan rotor blades 131. Three of the fan rotor blades 131 are shown in FIG. 6. The fan rotor blades 131 rotate in the direction indicated by arrow 70. Three of the outlet guide vanes 23 are shown in FIG. 7. A sensor 50, which may comprise a yaw probe, is disposed at the leading edge 233 of one of the outlet guide vanes 23.

Three vectors are also shown in FIG. 7. A first vector u represents the circumferential velocity due to rotation of the propulsive fan 13. A second vector w represents the relative velocity of the air flow observed by the rotating fan blade. A third vector v represents the actual velocity vector observed by the fan outlet guide vanes 23.

Measurements from the yaw tubes disposed at the leading edges of (at least some of) the fan outlet guide vanes may be used to derive values of total pressure, static pressure and swirl angle for each stream tube. Deriving a value for the swirl angle for each stream tube may provide information on the angle of incidence of the fluid flow with the outlet guide vanes and hence pressure loss.

Figure 8:
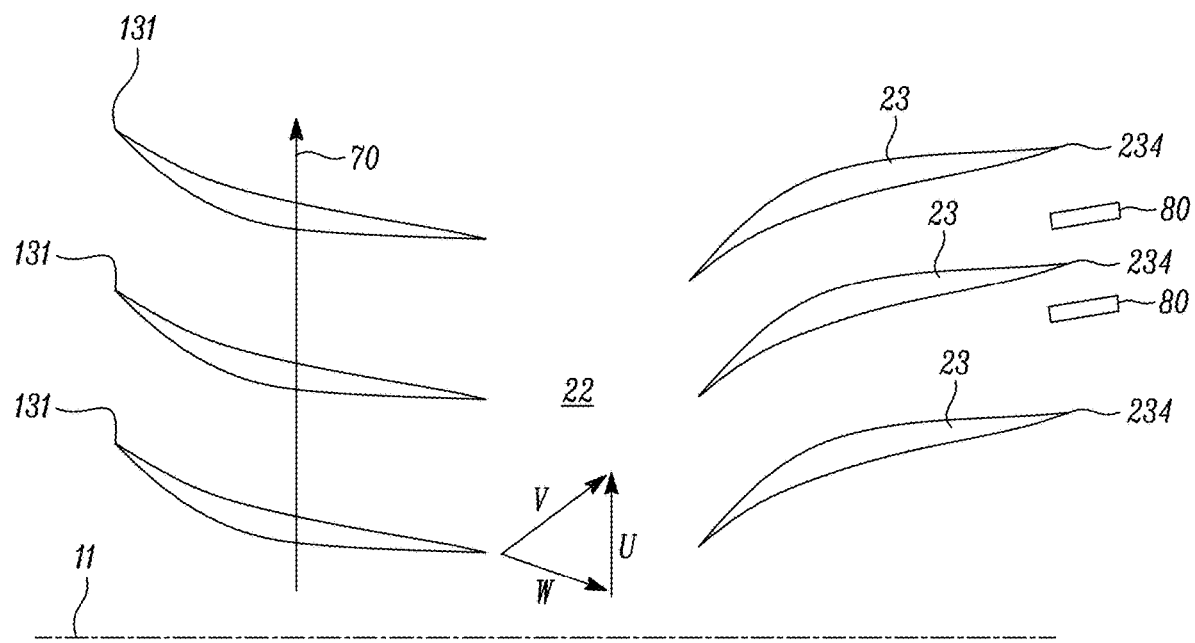
FIG. 8 is a schematic longitudinal cross-sectional view of a portion of a bypass duct with another apparatus for estimating flow of a fluid through an annulus disposed therein.

FIG. 8 is a schematic longitudinal cross-sectional view of a portion of the bypass duct 22, including another embodiment of an apparatus for estimating a parameter, e.g. (mass or volume) flow, of a fluid flowing in a passage. As in FIG. 7, the principal axis 11 of the gas turbine engine is indicated by a dashed line. The propulsive fan 13 comprises a plurality of fan rotor blades 131. Three of the fan rotor blades 131 are shown in FIG. 8. The fan rotor blades 131 rotate in the direction indicated by arrow 70. Three of the outlet guide vanes 23 are shown in FIG. 8.

A plurality of sensors 80 are arranged in a common measurement plane a short distance downstream of the trailing edges 234 of the outlet guide vanes 23. Two of the sensors 80 are shown in FIG. 8. The sensors 80 are disposed such that they are each aligned longitudinally with a central part of a gap between a pair of adjacent outlet guide vanes 23. The plurality of sensors 80 may be arranged in a regular or irregular pattern within the common measurement plane. Each sensor 80 may comprise a pressure measurement instrument operable to measure fluid flow velocity such as a Pitot tube. Each sensor 80 may comprise a yaw tube. A stream tube may be associated with each sensor 80.

Three vectors are also shown in FIG. 8. A first vector u represents the circumferential velocity due to rotation of the propulsive fan 13. A second vector w represents the relative velocity of the air flow observed by the fan rotor blade. A third vector v represents the actual velocity vector observed by the fan outlet guide vanes 23.

The sensors 80 may be located downstream of the outlet guide vanes 23 at positions where fluid flow may be or may not be disturbed by wakes from the outlet guide vanes 23. The sensors 80 may comprise Pitot tubes or yaw probes, which may be operable to measure total and static pressure. The swirl angle may be assumed to be close to the outlet guide vane outlet angle.

The apparatuses for estimating a parameter of a fluid flowing in a passage may comprise sensors operable to measure more than one property of the fluid flowing in the passage. Fluid properties that may be measured may include: pressure, e.g. total pressure or static pressure, temperature, fluid flow velocity, fluid flow speed and/or fluid flow direction, e.g. yaw angle of flow.

Measured values for each stream tube measured by the sensors 50, 80 may be stored locally, e.g. in memory in a data logger, for later analysis. The measured values may be stored temporarily or permanently. Alternatively, measured values measured by the sensors 50, 80 may be communicated to a processor or computer for processing in real-time or near-real-time. The processor or computer may be located remotely from the sensors. The measured values may be communicated continuously, intermittently or periodically, e.g. at regular intervals.

The processor or computer is configured to use the measured value(s) for each stream tube to calculate a derived value for each stream tube. The processor is configured to sum the derived values across all of the stream tubes. The computer is configured to generate an estimate of the parameter of the fluid flowing in the passage based on the sum of the derived values across all of the stream tubes.

The parameter may be fluid (mass or volume) flow. The estimate of fluid flow through the passage, e.g. bypass duct, may be used to provide an estimate of in-flight thrust.

By taking many simultaneous measurements of one or more properties of the fluid flowing in the passage, e.g. bypass duct, good coverage and/or reduced sampling error may be achieved.

The present disclosure may reduce uncertainty of in-flight derived thrust during flight testing.

The plurality of instruments in the common measurement plane may provide simultaneous multiple readings of one or more properties of the fluid flowing in the passage. The one or more properties, e.g. pressure, are measured at specific radial and circumferential positions within the common measurement plane.

By positioning the common measurement plane in the vicinity of, or downstream of, the outlet guide vane(s) in the bypass duct, a more accurate estimate of fluid (mass or volume) flow may be derivable. The derived estimate of fluid (mass or volume) flow may be more accurate than can be obtained using known methods such as: (i) a derived fluid (mass) flow estimate based on intake pressure measurements, as this may be inaccurate due to uncertainty in the assumed intake effective area and/or the assumed intake discharge coefficient; or (ii) a derived fluid (mass) flow estimate based on nozzle performance, as this may be inaccurate due to uncertainty in the assumed nozzle discharge coefficient.

Figure 9:
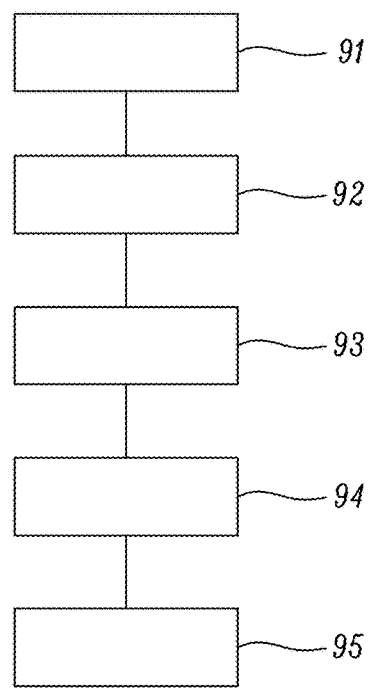
FIG. 9 is a flow chart illustrating a method of estimating flow of a fluid through an annulus.

FIG. 9 illustrates a method of estimating a parameter of a fluid flowing in a passage such as a bypass duct of a gas turbine engine.

A first step 91 comprises providing a plurality of instruments operable to measure one or more properties of the fluid flowing in the passage, the plurality of instruments being disposed in the passage and arranged within a common measurement plane. The common measurement plane may be at an angle to a longitudinal axis of the annulus.

In a second step 92, a stream tube is assigned to each instrument. Each stream tube represents a region of space in the common measurement plane within the passage and each stream tube surrounds one of the plurality of instruments. The stream tubes together correspond to the cross-sectional shape and area of the passage in the common measurement plane.

A third step 93 comprises measuring the one or more properties of the fluid using the instruments to obtain one or more measured values for each stream tube.

A fourth step 95 comprises using the measured value(s) for each stream tube to calculate a derived value for each stream tube.

A fifth step 95 comprises summing the derived values across all of the stream tubes.

A formula for estimating mass flow in an annulus from measurements of static pressure and total pressure is given by Equation 1 below.

$$WTAP = \frac{W_{1A} \times \sqrt{T_{t1A}}}{P_{t1A} \times A_{1A}} =$$

$$\left(\frac{P_{s1A}}{P_{t1A}}\right)^{\left(\frac{1}{\gamma}\right)} \times \sqrt{\frac{2\gamma}{R(\gamma-1)}\left[1-\left(\frac{P_{s1A}}{P_{t1A}}\right)^{\left(\frac{\gamma-1}{\gamma}\right)}\right]} * \cos\alpha$$

Equation 1

Figure 4:
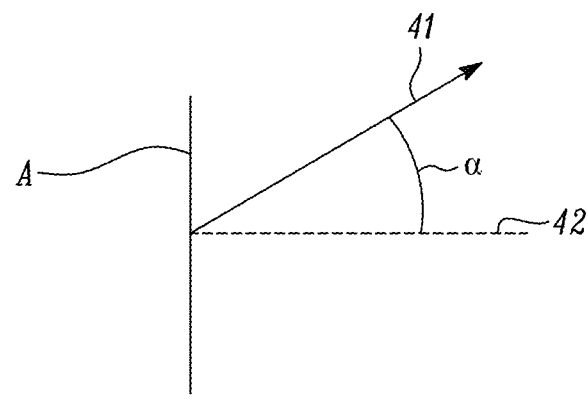
FIG. 4 illustrates a swirl angle.

In Equation 1:
$P_s$=static pressure
$P_t$=total pressure
W=mass-flow

γ=ratio of specific heats, a gas property that is an explicit function of temperature and chemical composition; for the derivation of the equation above it is considered constant. For air γ≈1.4 is a very good approximation in the bypass duct.
R=gas constant
$T_t$=total temperature
A=area FIG. 4 also refers to Equation 1. FIG. 4 shows an effective area A. The effective area A may be region within a lateral plane in an annulus. A dashed line 42 normal to the effective area A indicates a longitudinal direction through the annulus. An arrow 41 represents a flow vector for mass flow through the effective area A. A swirl angle α is the angle between the longitudinal direction through the annulus (dashed line 42) and the flow vector (arrow 41).

The present disclosure may reduce uncertainty of in-flight derived thrust during flight testing.

In the present disclosure, it will be noted that averaging of measured quantities is not carried out before the estimation of fluid (mass) flow, as per typical known zero-dimensional fluid (mass) flow derivations. In the present disclosure, fluid (mass) flow derivation is carried out individually for all of the streams in the common measurement plane. The overall fluid (mass) flow through the passage, e.g. within the bypass duct of a gas turbine engine, is the spatial sum of the individual stream tube fluid (mass) flows.

In accordance with the present disclosure, an estimate of fluid (mass or volume) flow may be derived in the engine environment, based on measurements, and without relying on an assumed nozzle discharge coefficient of uncertain accuracy.

The estimated fluid (mass or volume) flow derived in the engine environment in flight, e.g. during a flight test, may be used to derive an in-flight estimate of the nozzle discharge coefficient. The in-flight estimate of the nozzle discharge coefficient may be compared with the assumed value (e.g. sea level static test result) to identify a difference. The difference between the in-flight estimate of the nozzle discharge coefficient and the assumed value experimentally provides within tolerance an estimate of the effects of wing-engine interaction. Otherwise, the effects of wing-engine interaction are estimated using analytical methods.

By way of comparison, it is known to derive in-flight thrust based on derivation of fluid (mass) flow and jet velocity assuming:
cold nozzle performance, i.e. discharge and velocity coefficients;
a series of total pressure measurements, which are averaged and corrected for position to derive total pressure at the cold nozzle plane;
the ratio of total pressure at nozzle plane to ambient or base pressure provides Mach number at nozzle plane;
assumed fan efficiency provides an estimate of temperature, which in conjunction with the Mach number above provide exhaust jet velocity;
jet velocity and the effective nozzle area (effective area being the geometric nozzle area multiplied by the assumed nozzle discharge coefficient) are used to estimate fluid volume flow (WTAP);
knowledge of absolute averaged total pressure and temperature are used to derive fluid mass flow (W) from fluid volume flow (WTAP);
fluid mass flow and jet velocity estimated as described above and the assumed nozzle velocity coefficient together provide an estimate of gross thrust.

In effect, in known methods, both derived fluid (mass or volume) flow and jet velocity, which are used for the estimation of in-flight thrust, are estimated on the basis of a nozzle discharge coefficient, which is derived by other means outside the engine environment and without the engine manufacturer being accountable or involved. Accordingly, the accuracy of any derived estimate of fluid (mass or volume) flow will be uncertain.

Figure 10:
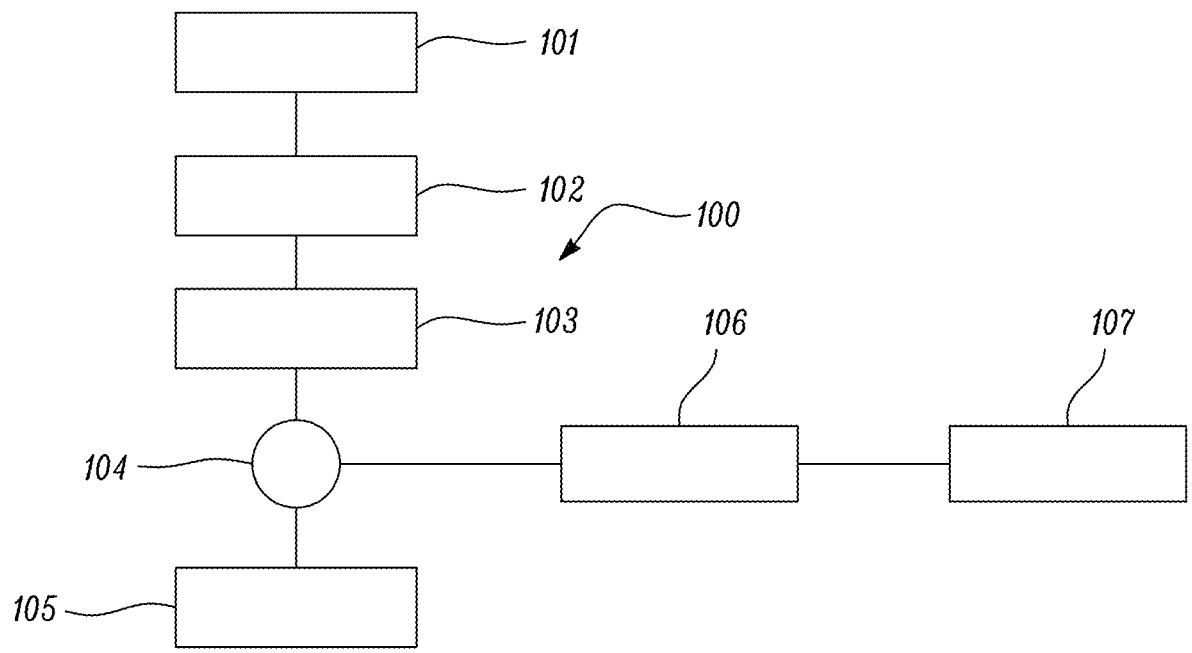
FIG. 10 illustrates the operation of a control system for an aircraft, the control system being operable to provide a modified primary control parameter for the aircraft.

FIG. 10 illustrates a control system 100 for an aircraft. The control system 100 provides a modified primary control parameter 105 for the aircraft.

The control system 100 includes a primary control parameter leg and a primary control parameter compensation leg.

In the primary control parameter leg, an aircraft signal 101, say from an aircraft sensor monitoring operation of the aircraft, causes a pilot or autopilot to implement a thrust demand 102 for the aircraft's engine(s) to deliver increased or decreased thrust. The thrust demand 102 generates a demand in the primary control parameter 103.

In the primary control parameter compensation leg, a detected change 107 in absolute levels and/or the spatial distribution of swirl angle and/or fan pressure at a primary control parameter relative to a reference is detected. Deriving, and hence detecting any change in absolute levels and/or the spatial distribution of swirl angle and/or fan pressure may include making use of an estimated flow of a fluid through the bypass duct of the aircraft's engine(s), e.g. produced using a method disclosed herein such as the method of FIG. 9 and/or by using an apparatus disclosed herein such as the apparatus of any one of FIG. 5, 6, 7 or 8.

In the primary control parameter compensation leg, the detected change 107 in absolute levels and/or the spatial distribution of swirl angle and/or fan pressure is then converted into a change to the primary control parameter 106.

The primary control parameter leg and the primary control compensation leg both feed into a processor 104. The processor 104 receives the demand in the primary control parameter 103 output from the primary control parameter leg and the change to the primary control parameter 106 output from the primary control parameter compensation leg.

The processor 104 compares the demand in the primary control parameter 103 from the primary control parameter leg and the change to the primary control parameter 106 output from the primary control parameter compensation leg and generates a modified primary control parameter 105.

Figure 11:
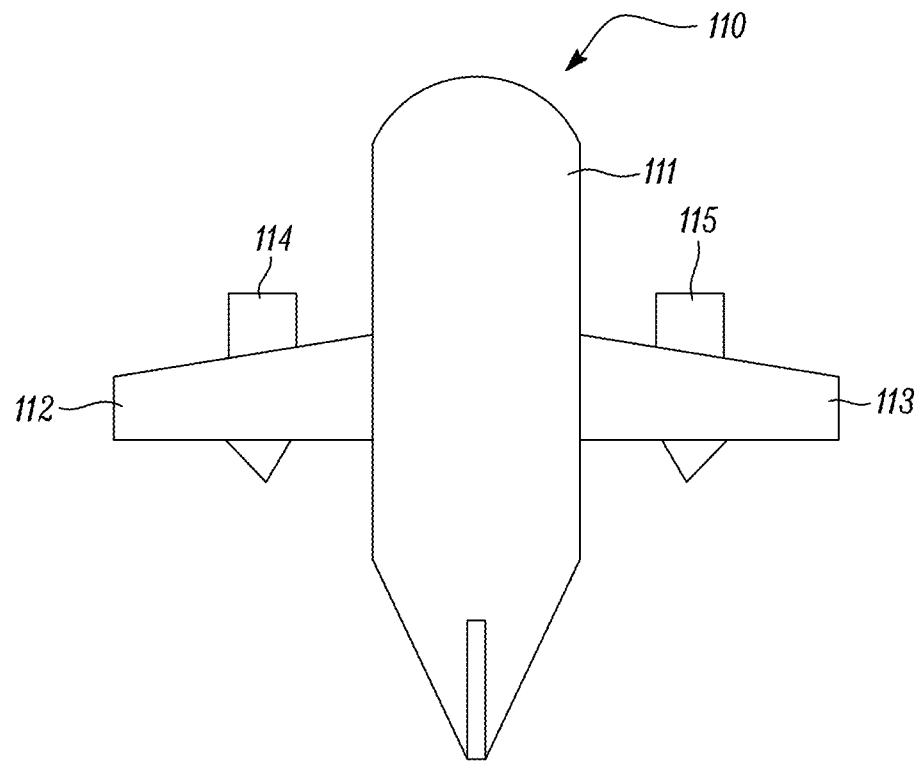
FIG. 11 is a schematic illustration of an example of an aircraft, to which the methods and apparatuses of the present disclosure may be applied.

FIG. 11 shows an example of an aircraft 110, which may be a flight test aircraft. The aircraft 110 comprises a fuselage 111. A first wing 112 extends from one side of the fuselage 111 and a second wing 113 extends from the other side of the fuselage 111. The first wing 112 has a first engine 114 mounted thereunder. The second wing 113 has a second engine 115 mounted thereunder. The first engine 114 and the second engine 115 are gas turbine engines. The first engine 114 and the second engine 115 comprise apparatus as described herein, e.g. as illustrated in FIG. 5, 6, 7 or 8, for estimating the flow of air through the bypass duct. By practising the methods disclosed herein, an estimate of the flow of air through the bypass duct may be obtained based on measurements made by instruments located within a common measurement plane within the bypass duct. Operation of the aircraft 110 may include use of a control system that makes use of the estimated flow of air through the bypass duct, and/or the distribution of swirl flow angle or pressure, to provide a modified primary control parameter to the aircraft. An example control system was described herein in relation to FIG. 10.

The aircraft may comprise a different number and arrangement of engines from that described in relation to the example shown in FIG. 11.

The present disclosure can be used to estimate fluid flow through an annulus, e.g. an annulus having strong non-uniform profiles in pressure and/or temperature. Hence, for example, the present disclosure may be employed in a cold section or a hot section of an aerospace, marine or industrial gas turbine engine. Similarly, the present disclosure may be applied to an electrically driven aircraft propulsor, such as a motor driven ducted fan.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

The invention claimed is:

1. A method of estimating an air mass flow (WTAP) of air flowing in a fan duct comprising:
providing a plurality of instruments operable to measure one or more properties of the air flowing in the passage, the one or more properties comprising each of static pressure $P_s$ and total pressure $P_t$, the plurality of instruments being disposed in the passage and arranged within a common measurement plane;
assigning a stream tube to each instrument, wherein each stream tube represents a region of space in the common measurement plane within the passage and each stream tube surrounds one of the plurality of instruments, wherein the stream tubes together correspond to the cross-sectional shape and area of the passage in the common measurement plane;
measuring the one or more properties of the fluid using the instruments to obtain one or more measured values for each stream tube;
using the measured value(s) for each stream tube to estimate an air mass flow in an annulus of the common measurement plane from the measurement for each stream tube according to the equation:

$$WTAP = \frac{W_{1A} \times \sqrt{T_{t1A}}}{P_{t1A} \times A_{1A}} = \left(\frac{P_{s1A}}{P_{t1A}}\right)^{\left(\frac{1}{\gamma}\right)} \times \sqrt{\frac{2\gamma}{R(\gamma-1)}\left[1-\left(\frac{P_{s1A}}{P_{t1A}}\right)^{\left(\frac{\gamma-1}{\gamma}\right)}\right]} * \cos\alpha,$$

where:
W=mass flow,
γ=a ratio of specific heats of air,
R=a gas constant,
A=an area of the stream tube, and
α=an angle between a longitudinal direction through the annulus and a flow vector; and
summing the air mass flow across all of the stream tubes.

2. A method according to claim 1, wherein the common measurement plane is at an angle to a longitudinal axis of the passage.

3. A method according to claim 1, wherein the passage is a bypass duct of a gas turbine engine.

4. A method according to claim 3, wherein the common measurement plane is located within the bypass duct downstream of a propulsive fan.

5. A method according to claim 3, wherein the common measurement plane is located upstream of, downstream of, or in the region of one or more outlet guide vanes within the bypass duct.

6. A system for estimating an air mass flow (WTAP) of air flowing in a fan duct, the system comprising:
- a plurality of instruments operable to measure a property of the fluid flowing in the passage, the plurality of instruments being disposed in the passage and arranged within a common measurement plane; and
- a computer adapted to communicate with the plurality of instruments and to:
  - receive measured values of the one or more properties of the fluid air measured by the plurality of instruments, the one or more properties comprising each of static pressure $P_s$ and total pressure $P_t$;
  - assign a stream tube to each instrument, wherein each stream tube represents a region of space in the common measurement plane within the passage and each stream tube surrounds one of the plurality of instruments, wherein the stream tubes together correspond to the cross-sectional shape and area of the passage in the common measurement plane;
  - use the measured value(s) for each stream tube to estimate the air mass flow in an annulus of the common measurement plane from the measurement for each stream tube according to the equation:

$$WTAP = \frac{W_{1A} \times \sqrt{T_{t1A}}}{P_{t1A} \times A_{1A}} = \left(\frac{P_{s1A}}{P_{t1A}}\right)^{\left(\frac{1}{\gamma}\right)} \times \sqrt{\frac{2\gamma}{R(\gamma-1)}\left[1 - \left(\frac{P_{s1A}}{P_{t1A}}\right)^{\left(\frac{\gamma-1}{\gamma}\right)}\right]} * \cos\alpha$$

where:
W=mass flow,
γ=a ratio of specific heats of air,
R=a gas constant,
A=an area of the stream tube, and
α=an angle between a longitudinal direction through the annulus and a flow vector; and
sum the air mass flow across all of the stream tubes.

7. The system according to claim 6, wherein the common measurement plane is at an angle to a longitudinal axis of the passage.

8. The system according to claim 6, wherein the passage is a bypass duct of a gas turbine engine.

9. The system according to claim 6, wherein the plurality of instruments is arranged within the common measurement plane in a regular or an irregular pattern.

10. The system according to claim 6, wherein the plurality of instruments are spaced at intervals, in a circumferential direction and/or in a radial direction.

11. The system according to claim 6, wherein each instrument comprises a pressure sensor, a sensor operable to measure or derive fluid flow velocity and/or a sensor operable to measure or derive fluid flow direction.

12. The system according to claim 10, comprising one or more data storage devices adapted to store the measured values measured by the instruments.

13. The system according to claim 6, wherein the computer is adapted to integrate the derived values across all of the stream tubes.

14. The system according to claim 6, wherein the passage is a bypass duct of a gas turbine engine for an aircraft and the computer is further adapted to provide an estimate of in-flight thrust, based on the generated estimate of fluid volume flow in the passage.

15. A gas turbine engine comprising an apparatus according to claim 6.

* * * * *